United States Patent [19]

Gest

[11] Patent Number: 4,830,418

[45] Date of Patent: May 16, 1989

[54] ENERGY ABSORBER WITH IMPACT BUMPER ADJUSTMENT

[75] Inventor: William E. Gest, Troy, Mich.

[73] Assignee: General Motors Corporation, Detroit, Mich.

[21] Appl. No.: 134,350

[22] Filed: Dec. 17, 1987

Related U.S. Application Data

[63] Continuation-in-part of Ser. No. 423,607, Sep. 27, 1982, abandoned.

[51] Int. Cl.$^4$ ............................................. B60R 19/32
[52] U.S. Cl. .................................. 293/134; 293/132; 293/155; 248/298; 248/636; 403/4; 403/104
[58] Field of Search ................... 293/1, 132, 134, 154, 293/155; 248/251, 288.1, 298, 558, 566, 636; 403/4, 104, 118, 336, 343; 285/62, 414

[56] References Cited

U.S. PATENT DOCUMENTS

| | | | |
|---|---|---|---|
| 3,700,273 | 10/1972 | Jackson et al. | 293/134 |
| 3,972,551 | 8/1976 | Fannin | 293/134 |
| 4,050,714 | 9/1977 | Epp | 403/104 X |
| 4,303,267 | 12/1981 | Haberle et al. | 293/155 |
| 4,437,548 | 3/1984 | Ashiba | 293/134 X |
| 4,607,975 | 8/1986 | Lo | 403/104 X |

Primary Examiner—Robert B. Reeves
Assistant Examiner—Russell D. Stormer
Attorney, Agent, or Firm—Charles R. White

[57] ABSTRACT

These telescopic energy absorber units have outer tubes threaded into connection with vehicle hard bar bumper or fascia support to permit fore and aft adjustment by rotation of the piston tube of the unit in clockwise or counterclockwise direction.

11 Claims, 2 Drawing Sheets

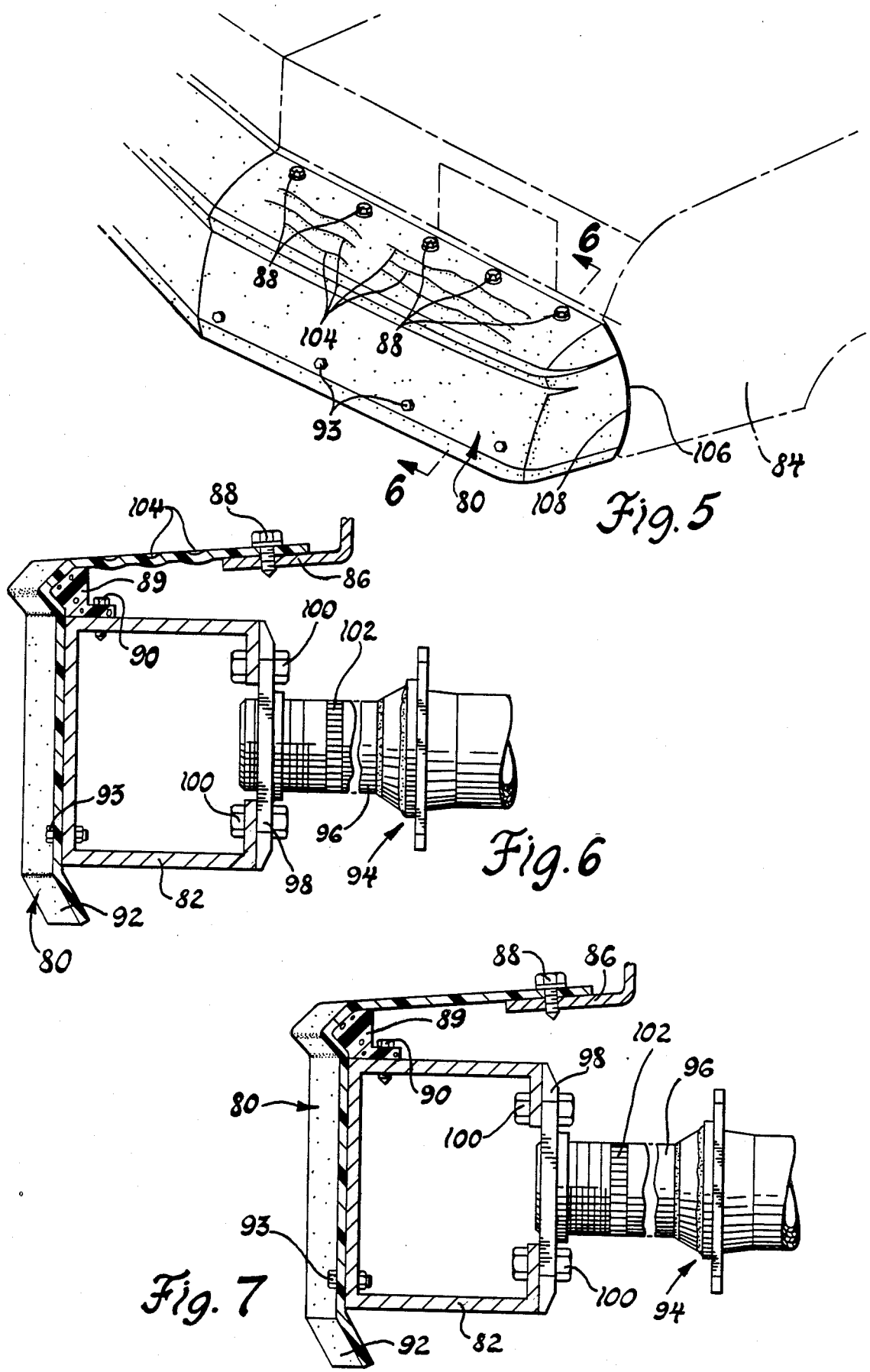

ENERGY ABSORBER WITH IMPACT BUMPER ADJUSTMENT

This is a continuation-in-part of application Ser. No. 423,607, filed Sept. 27, 1982, and now abandoned.

This invention relates to adjustable bumpers for a vehicle and more particularly to a new and improved telescopic energy absorber featuring adjustable connection between the energy absorber and the bumper facilitating the adjustment of the bumper or bumper reinforcement relative to the vehicle body. This invention further relates to a new and improved method of adjusting bumpers and facias relative to support structures in the vehicle.

Prior to the present invention, various energy absorber units have been utilized to mount an impact bumper to the frame or other support structure of a motor vehicle. Generally, a pair of identical energy absorber units attached to the end portions of the side rails support the bumper outwardly of the vehicle body for movement between extended and retracted positions. The outer ends of these energy absorber units have fixed brackets that are attached by nut and bolt means to mounting shoulders onto special brackets affixed to the vehicle bumper. In order to properly align and space the bumper with respect to the vehicle body, special shims of varying thicknesses may be inserted between the end of the energy absorber unit and the bracket. While such shims provided an acceptable means for bumper adjustment, their usage is time consuming, laborious and expensive and often increases vehicle weight. For precise adjustment of a particular bumper, custom selection of shims of particular thickness is required. In mass production situations, such custom selection is not practical and shims are selected on a pattern basis. Pattern selection may result in inconsistent positioning of some bumpers so that readjustment is necessary. Furthermore, if a shim is inadvertently left off of or added to a bumper mounting, a plurality of threaded fasteners has to be loosened or removed before the shim could be installed or removed.

In contrast to the prior art shim adjustment, the present invention, which involves the minimum modification to many existing telescopic energy absorber units, facilitates the fore and aft adjustment of the bumper or fascia with respect to the vehicle body and without disturbance of any threaded fasteners used to attache the energy absorber bracket to the bumper. Furthermore, the adjustment can be accomplished without adding or subtracting any shims. More particularly, this invention is embodied in an energy absorber unit having a rotatable piston tube of a telescopic energy absorber unit threaded on its outside diameter. The bumper attachment bracket is modified to have a matching threaded inside diameter. When the energy absorber unit is installed on a vehicle, the bumper attachment bracket is threaded onto the piston tube and the subassembly of the bracket and energy absorber is loaded and secured to the vehicle body or frame. Subsequently, the bumper is attached by threaded fasteners to the energy absorber bracket by threaded fasteners. At this point, the fore-aft relationship of the bumper to the vehicle body is set by simply rotating the piston tube of the energy absorber clockwise or counterclockwise depending on whether increased or counterclockwise depending on whether increased or decreased bumper-vehicle body spacing is desired.

It is a feature, object and advantage of this invention to provide a new and improved adjustment between a vehicle supported energy absorber unit and a bumper supported by the energy absorber which allows the fore and aft relationship of the bumper to be readily varied by the rotation of the piston tube of the energy absorber unit to effect precision setting of the bumper with respect to the vehicle body.

These and other features, objects and advantages of this invention will be more apparent from the following detailed description and drawings in which:

FIG. 5 is an isometric view of a forward portion of a motor vehicle.

FIG. 6 is a view partly in cross-section, taken along lines 6—6 of FIG. 5 before energy absorber adjustment.

FIG. 7 is a view similar to that of FIG. 6 illustrating the energy absorber in an adjusted position.

Figure 1:
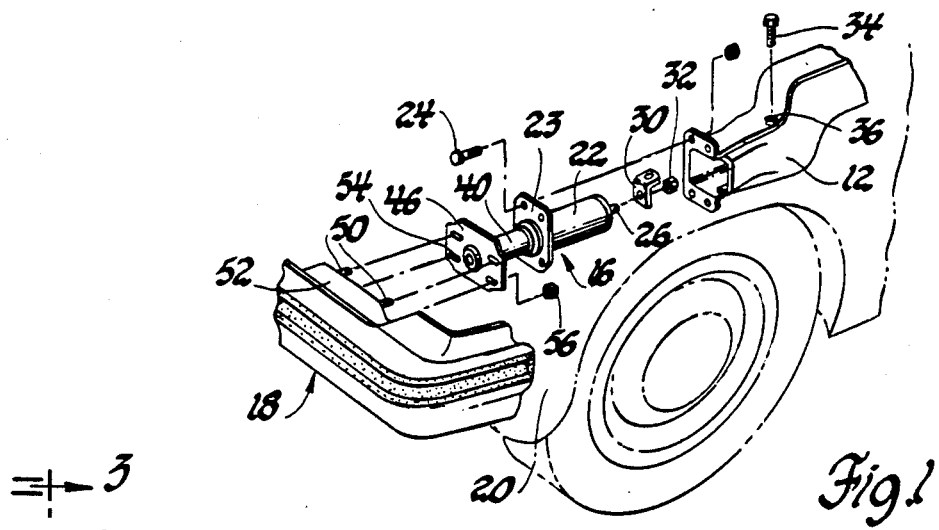
FIG. 1 is an isometric view with parts exploded of a portion of a motor vehicle.
Figure 2:
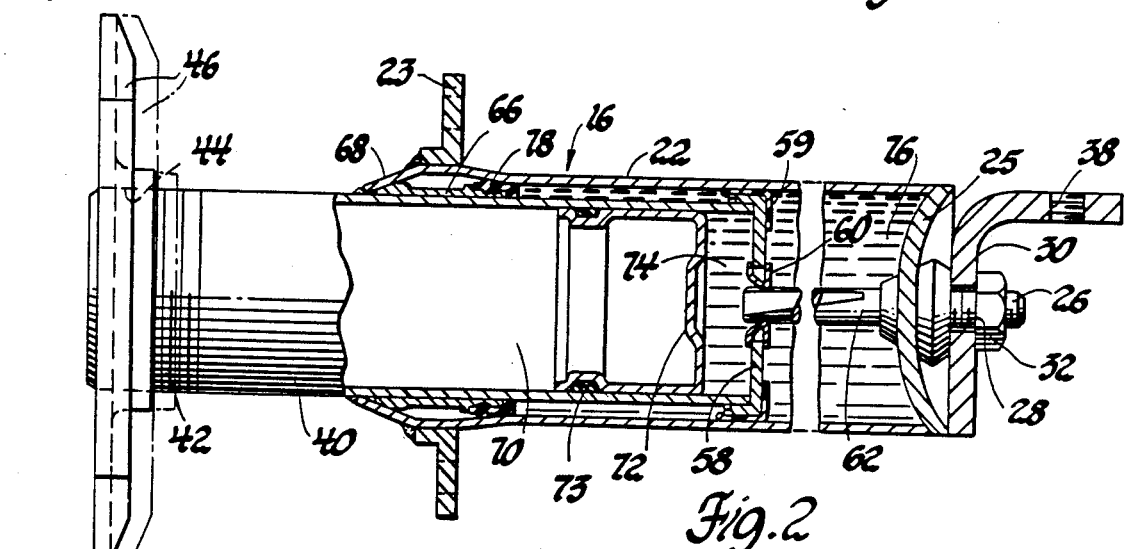
FIG. 2 is a cross-sectional view of the adjustable energy absorber utilized to mount a bumper to the vehicle.
Figure 4:
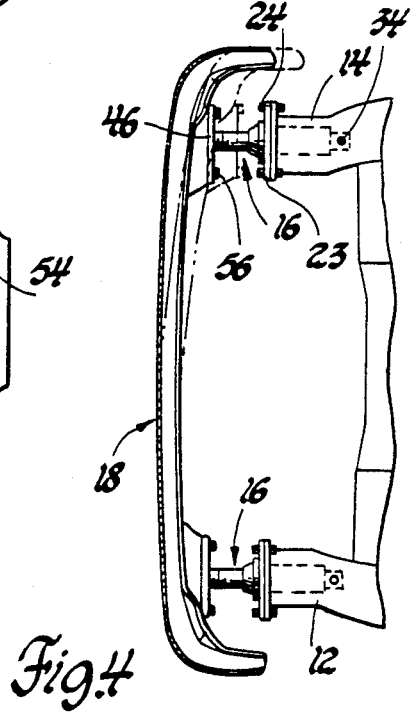
FIG. 4 is a top plan view illustrating adjustment of the energy absorbers to adjust bumper position.

Turning now in greater detail to the drawings, FIGS. 1 and 4 show components of a forward part of a vehicle including laterally-spaced left and right hand side rails 12 and 14. Secured to forward end portions of the side rails are identical telescopic energy absorbing units 16 which support an impact bumper assembly 18 laterally across and in spaced relationship from the vehicle body work 20.

Each energy absorber unit comprises an outer cylinder 22 which has a mounting collar 23 welded thereto which fits against the end flange of the associated side rail and is secured thereto by threaded fasteners 24. The outer cylinder is closed by an annular end cap 25 which has a rearwardly projecting stud 26 welded or otherwise centrally fastened thereto. Stud 26 extends through an opening 28 in one leg of an L-shaped bracket 30 into threaded engagement with a nut 32 which, when tightened, secures the bracket 30 to the energy absorber. The bracket 30 is in turn secured to the interior of the side rail by a threaded fastener 34 which extends through an opening 36 in the top of the side rail into connection with threaded opening 38 of the other leg of the bracket 30.

In addition to the outer cylinder 22 each energy absorber unit 16 comprises an inner cylinder 40 mounted for axial rotation and telescopic sliding movement with respect to the outer cylinder 22. The inner cylinder 40 is closed at its outermost end by a closure plate 41. Also, the outermost end of the inner cylinder 40 is externally threaded at 42 for threaded connection with a threaded central adjustment opening 44 of a bumper mounting bracket 46. This mounting bracket 46 is adapted to be secured to the bumper assembly 18 by bolts 50, projecting from a mounting shoulder 52 which forms part of the bumper assembly. Bolts 50 extend through lateral adjustment openings 54 in the bracket 46 and nuts 56 threaded onto the bolts secure the bumper assembly in a laterally adjusted position to the energy absorbing units 16. The internal construction and operation of these energy absorber units is basically the same as the energy unit disclosed in U.S. Pat. No. 3,700,273, entitled Energy Absorbing Bumper System, issued Oct. 24, 1973 to Jackson et al, hereby incorporated by reference.

The inner end of the inner cylinder 40 has a cap 58 fitted with an anti-friction bearing sleeve 59 slidably engaging the inner wall of the outer cylinder 22. The cap has a centralized floating orifice element 60 for accommodating a metering rod 62 that extends axially in the energy absorber unit from attachment with the end cap 24.

The energy absorber unit 16 is normally urged to an outwardly extended position in which a tapered annular bearing and stop sleeve 66 secured to the inner cylinder 40 engages the tapered interior wall of the outward end 68 of the outer cylinder 22, by the pressure of a quantity of gas in chamber 70. The gas in chamber 70 is injected through an orifice in closure plate 41 subsequently trapped therein by a ball 71 welded in the orifice. The gas exerts pressure through a floating piston 72 fitted with O-ring 73 and slidably mounted in cylinder 40 on a column of oil in expansable and contractible chambers 74, 76 hydraulically interconnected through the orifice. Disposed over the end of the stop sleeve 66 is a resilient cylindrical sleeve 78 which adds internal friction to the unit which releasably frictionally holds the cylinders 70 and 22 in a relatively rotated position and provides improved rebound control through friction drag as well as providing a fluid seal.

When the bumper assembly 18 is impacted by an impact load greater than a predetermined minimum load, the telescopic retracting movement of the inner cylinder with respect to the outer cylinder will affect the metered flow of oil between the chambers 74 and 76 through the decreasing orifice area to dissipate impact energy. After removal of the impact load from the bumper assembly, the force exerted by the gas spring in chamber 70 will return the cylinders 22 and 40 to their original extended position to move the bumper back to the impact position at a predetermined rate of recovery.

Figure 3:
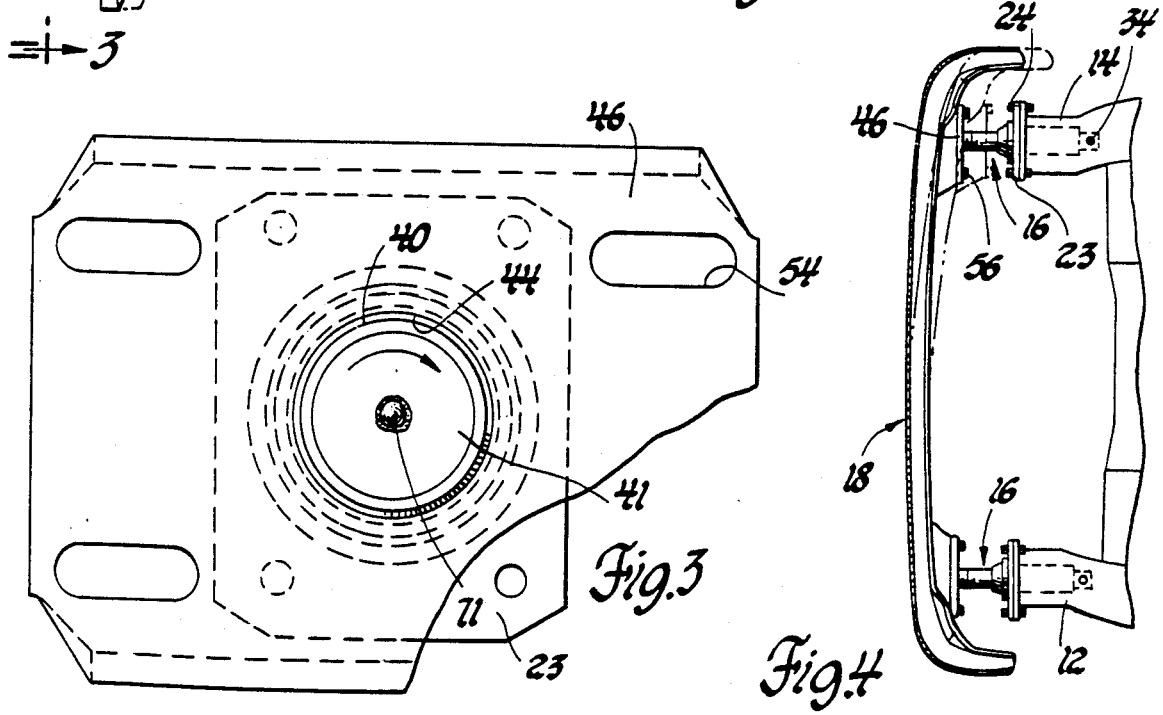
FIG. 3 is a front view taken along lines 3—3 of FIG. 2.

FIG. 4 illustrates the fore and aft adjustment of the bumper assembly by the turning of the inner cylinder 40 within outer cylinder 22 of the right hand energy absorber unit 16 relative to the bumper assembly 18 and the mounting bracket 46 fixed to the bumper assembly. The threaded connection between the inner cylinder 40 and the bracket 46 is preferably right hand threading. By rotating the inner cylinder, clockwise as shown by the arrow in FIG. 3, by a wrench or other suitable tooling, the bracket 46 will be threadedly advanced toward the end of the inner cylinder 40 to move the bumper assembly from the phantom line to the full line position. Thus, with this invention, the length of the bumper energy absorber and the fore-aft relationship of the bumper to the body can be readily changed by rotating the piston tube of the energy absorber through a number of turns clockwise or counterclockwise depending on whether increased or decreased length is desired.

If desired, a lock nut can be utilized on the threads 42 to abut the bracket 46 after the fore-aft bumper adjustment to provide a positive stop preventing inadvertent rotation of the inner cylinder 40 during normal vehicle operation. However, such is not generally required since the friction of the internal O-ring seals and stops provide prevailing torque to prevent such rotation during vehicle operation. Furthermore, a jam nut could be installed on the inboard end of the threads 42 or suitable lugs added to the tube 40 to provide gripping surfaces for tooling used to turn the tube 40 for bumper adjustment.

While the adjustment has been described in connection with a hard bar bumper system, this invention can be readily utilized with a soft face bumper reinforcement assembly with a covering fascia.

In FIG. 5 a shell-like fascia 80 of a suitable engineering plastics material provides a resilient finishing covering for a hard bar bumper beam 82 which extends transversely across one end of the vehicle 84 that has body work of sheet metal or other suitable material terminating in a fixed and transversely extending support ledge 86. Threaded fasteners 88 secure the top edge of the resilient fascia to ledge 86 and from this attachment the fascia extends around the laterally extending filler 89, preformed from a suitable foamed plastics or other material, that is fixed to the bumper beam by threaded fastener 90. The fascia extends across the face of the bumper beam to a bottom edge portion 92. Suitable front fillers may be used as necessary to appropriately provide support for the contour of the fascia. Threaded fasteners 93 secure the fascia of the bumper beam as may be desired. A pair of energy absorber units 94, the same as units 16 in the first embodiment, are employed in this embodiment. Accordingly, the energy absorber units 94 are attached to the side rails as shown and described in connection with FIG. 1. Also the piston tube 96 of each energy absorber threads into an associated bracket 98 as described in connection with units 16. These brackets are fixed to the bumper beam by threaded fasteners 100. The bracket connection is of any suitable configuration such as with elastomer isolators or pivots if needed that the bumper can be adjusted without damage to the threaded piston tube. An annular band of serration 102 provides a convenient gripping surface for pliers preferably made from a suitable plastic material so that the piston tube may be turned for bumper adjustment without marring the piston tube.

FIGS. 5 and 6 illustrate the finishing fascia with distortions such as wrinkles 104 in the upper surface thereof which normally require shimming for removal. However, with the present invention, these distortions can be readily removed by applying the tooling to the piston tube at the serration band and turning the piston tube until the bumper beam is dispaced outwardly relative to the support structure to stretch and smooth the upper surface of the fascia and eliminate the distortions shown in FIG. 7. In addition to eliminating fascia distortions, this invention provides new and improved means for match line adjustment between the bumper assembly and the body work. For example, if the match line between the vertical edge 106 of the bumper assembly and 108 of the body work exhibits an undesired gap, the piston tube can be rotated as desired to set the bumper assembly position for the desired fit and matching of these parts. By this method, gaps can be closed to closer and tighter fits. After adjustment, the internal seal rings such as ring 78, in the FIG. 1 energy absorber unit, provide the internal friction required to maintain the adjustment of the piston tube. With this invention providing new and improved fascia installation and final fitting non-reinforced plastic materials may be employed instead of the reinforced materials.

Accordingly, the scope of this invention is set forth in the following claims.

The embodiments of the invention in which an exclusive property or privilege is claimed are defined as follows:

1. An energy absorbing unit for adjustably mounting a laterally extending bumper assembly to support structure within a vehicle comprising
   (a) a first tubular component secured to said support structure,
   (b) a second tubular component telescopically and rotatably mounted with respect to said first tubular component and projecting outwardly therefrom,
   (c) bracket means secured to said bumper assembly, and
   (d) threaded means capable of supporting the impact load operatively interconnecting the outer end portion of said second tubular component to said bracket means whereby said second tubular component can be rotated in clockwise or counterclockwise directions with respect to said first tubular component to threadedly advance or retract said second tubular component with respect to said bracket means to thereby adjust the fore and aft position of said bumper assembly with respect to said vehicle.

2. The energy-absorbing unit as specified in claim 1 wherein the second tubular component includes a serrated outer surface portion.

3. A telescopic energy absorber unit for a bumper for a vehicle operatively and adjustably connecting a laterally extending bumper beam to support structure within said vehicle and outwardly of body work of said vehicle for movement from an outer position toward said body work while absorbing energy directed to said bumper beam effecting said movement, said energy absorber unit comprising:
   (a) outer and inner tubes mounted in telescopic and relatively rotatable relationship with respect to one another and having energy absorbing means therein for dissipating impact energy,
   (b) first connecting means securing one of said tubes to support structure in said vehicle, and
   (c) second connecting means securing another of said tubes to said bumper beam, at least one of said connecting means being an adjustable threaded connection whereby the position of said bumper beam may be adjusted relative to said support structure by rotating one of said tubes relative to the other to accordingly move said bumper beam with respect to said body work of said vehicle to a selected bumper beam position.

4. A method of adjusting and stretching fascia of resilient plastics material covering a bumper beam of a vehicle and attached to support structure of a body work of said vehicle, comprising the steps of:
   (a) installing a pair of telescopic energy absorbing units having telescoping inner and outer tubes to support structure within said vehicle so that said units extend outwardly therefrom to a terminal point,
   (b) attaching an elongated bumper beam at an outer end portion of said energy absorber units by threaded adjustment means,
   (c) extending said fascia from an upper point of attachment to said body work over said bumper beam, and
   (d) rotating at least one of said tubes of said energy absorbing units relative to the other of said tubes of said energy absorbing units to move said bumper beam outwardly and stretch said fascia and eliminate distortions therein.

5. A telescopic energy absorber unit operatively and adjustably supporting a laterally extending bumper to support structure in a vehicle and outwardly of body work of said vehicle for match line adjustment between said bumper and said body work, said unit for movement from an outer position toward said body work while collapsing said unit and absorbing energy of a load directed onto said beam that effecting said movement, said energy absorber unit having:
   (a) outer and inner tubes mounted in telescopic and relatively rotatable relationship with respect to one another and having energy absorbing means therein for dissipating impact energy,
   (b) first connecting means securing a first of said tubes to said support structure, and
   (c) second connecting means securing a second of said tubes to said bumper beam, said second connecting means being a threaded adjustment formed by threads on the outer diameter of said second tube and mating threads in said bumper beam whereby the position of said bumper beam may be adjusted relative to said support structure by rotating said second tubes relative to said first tube to accordingly move said bumper with respect to said body work of said vehicle for match line adjustment.

6. A method of adjusting a bumper assembly for a vehicle with respect to support structure within a vehicle by threaded attachment means forming a threaded adjustment, comprising the steps of:
   (a) operatively attaching an energy absorbing unit having telescoping inner and outer tubes to said support structure,
   (b) operatively and threadingly attaching said bumper assembly to an end portion of said energy absorber unit by second attaching means, and
   (c) rotating at least one of said tubes of said energy absorbing unit relative to the other of said unit to move said bumper beam relative to said support structure.

7. An energy-absorbing assembly for adjustably mounting a bumper to a support structure, comprising:
   (a) a first tube fixedly secured at a first end to the support structure and having an opening at a second end;
   (b) a second tube telescopically receivable into the first tube through the first tube end opening, the second tube rotatably mounted with respect to the first tube and including a threaded portion and a serrated portion on its outer circumference extending beyond the first tube at all positions of the tubes, and
   (c) energy-absorbing means connected to the first and second tubes for dissipating impact energy.

8. An energy-absorbing bumper assembly comprising:
   (a) an elongated bumper beam;
   (b) at least a pair of telescopic energy absorbing units, each unit connected at a first end to a vehicle support structure and threadingly connected at a second end to the bumper beam; and
   (c) fascia attached to and extending between an outer surface of the bumper beam and a leading portion of a vehicle;
   wherein the fascia is stretched to a desired position by rotating the second ends of the energy absorbing units.

9. The energy-absorbing bumper assembly as specified in claim 8 wherein each energy absorbing unit comprises telescoping inner and outer tubes.

10. The energy-absorbing bumper assembly as specified in claim 9 wherein the inner tube is rotatably mounted with respect to the outer tube.

11. The energy-absorbing bumper assembly as specified in claim 10 including serration means on a portion of the outer surface of each inner tube extending beyond the outer tube.

* * * * *